US010767723B2

(12) United States Patent
Song et al.

(10) Patent No.: US 10,767,723 B2
(45) Date of Patent: Sep. 8, 2020

(54) TORQUE CONVERTER FOR VEHICLE

(71) Applicant: Valeo Kapec Co., Ltd, Daegu (KR)

(72) Inventors: Jun Yong Song, Daegu (KR); Soon Seok Hong, Daegu (KR); Soon Cheol Shin, Suwon-si (KR)

(73) Assignee: Valeo Kapec Co., Ltd, Daegu (KR)

( * ) Notice: Subject to any disclaimer, the term of this patent is extended or adjusted under 35 U.S.C. 154(b) by 15 days.

(21) Appl. No.: 16/302,767

(22) PCT Filed: Jul. 13, 2016

(86) PCT No.: PCT/KR2016/007588
§ 371 (c)(1),
(2) Date: Nov. 19, 2018

(87) PCT Pub. No.: WO2017/204404
PCT Pub. Date: Nov. 30, 2017

(65) Prior Publication Data
US 2019/0301561 A1    Oct. 3, 2019

(30) Foreign Application Priority Data
May 27, 2016    (KR) .................. 10-2016-0065882

(51) Int. Cl.
*F16F 15/123*    (2006.01)
*F16H 45/02*    (2006.01)
(Continued)

(52) U.S. Cl.
CPC ...... *F16F 15/12306* (2013.01); *F16F 15/121* (2013.01); *F16H 41/24* (2013.01); *F16H 45/02* (2013.01); *F16H 2045/0221* (2013.01)

(58) Field of Classification Search
CPC ...... F16F 15/12; F16F 15/1207; F16F 15/121; F16F 15/12306; F16F 15/1232;
(Continued)

(56) References Cited

U.S. PATENT DOCUMENTS

| 2009/0221376 A1* | 9/2009 | Movlazada ....... F16F 15/12306 464/180 |
| 2015/0107950 A1 | 4/2015 | Mauti |

(Continued)

FOREIGN PATENT DOCUMENTS

| JP | 59-6429 A | 1/1984 |
| JP | 2010-101345 A | 5/2010 |

(Continued)

OTHER PUBLICATIONS

International Search Report dated Feb. 16, 2017 in PCT/KR2016/007588 filed Jul. 13, 2016.

*Primary Examiner* — Jacob S. Scott
(74) *Attorney, Agent, or Firm* — Oblon, McClelland, Maier & Neustadt, L.L.P.

(57) ABSTRACT

A torque converter for a vehicle including a front cover; an impeller which is coupled to the front cover and rotates together with the front cover; a turbine which is disposed at a position facing the impeller; a reactor which is positioned between the impeller and the turbine and changes a flow of oil flowing from the turbine to the impeller; a lock-up clutch which has a piston that directly connects the front cover and the turbine; and a torsional damper which includes a pair of retaining plates that receives driving power of an engine from the turbine or the lock-up clutch, and a driven plate that is disposed between the retaining plates, the torsional damper being coupled to the lock-up clutch and absorbing impact and vibration applied in a rotation direction.

6 Claims, 5 Drawing Sheets

(51) Int. Cl.
*F16H 41/24* (2006.01)
*F16F 15/121* (2006.01)

(58) Field of Classification Search
CPC ............ F16F 15/12326; F16F 15/1234; F16H 2045/0205; F16H 2045/021; F16H 2045/0221; F16H 2045/0226; F16H 2045/0294; F16H 41/24; F16H 45/02
See application file for complete search history.

(56) References Cited

U.S. PATENT DOCUMENTS

| | | | |
|---|---|---|---|
| 2015/0122605 A1* | 5/2015 | Grossgebauer | F16F 15/1421 192/3.21 |
| 2015/0316123 A1* | 11/2015 | Dogel | F16H 45/02 74/572.2 |
| 2016/0169358 A1 | 6/2016 | Kawahara et al. | |
| 2017/0045111 A1* | 2/2017 | Li | F16D 3/12 |
| 2017/0356523 A1* | 12/2017 | Uehara | F16F 15/12366 |
| 2018/0163815 A1* | 6/2018 | Tomiyama | F16F 15/31 |
| 2019/0331196 A1* | 10/2019 | Kawahara | F16F 15/14 |

FOREIGN PATENT DOCUMENTS

| | | |
|---|---|---|
| JP | 2013-164090 A | 8/2013 |
| JP | 2013-174294 A | 9/2013 |
| KR | 2002-0048469 A | 6/2002 |
| KR | 10-2010-0054533 A | 5/2010 |
| KR | 10-2014-0067824 A | 6/2014 |
| KR | 10-2016-0032091 A | 3/2016 |

\* cited by examiner

TORQUE CONVERTER FOR VEHICLE

TECHNICAL FIELD

The present invention relates to a torque converter for a vehicle that may be applied as a torque converter having a torsional damper and has a driven plate which is formed with curved portions, and springs which are disposed in a longitudinal direction and apply elasticity to the curved portions, thereby increasing a limitation on an operating radius of the torsional damper and implementing low rigidity and a wide angle.

BACKGROUND ART

In general, a torque converter is installed between an engine and a transmission of a vehicle and serves to transmit driving power of the engine to the transmission by using a fluid. If a load applied to the engine is increased, power transmission efficiency of the torque converter may deteriorate, and therefore, the torque converter has a lock-up clutch (also called a 'damper clutch') which is a means for directly connecting the engine and the transmission. The lock-up clutch is disposed between the turbine and a front cover directly connected to the engine and enables rotational power of the engine to be transmitted directly to the transmission through the turbine.

The lock-up clutch includes a piston that may be moved in an axial direction of a turbine shaft. Further, a core plate is disposed between the piston and the front cover, and friction members are coupled to both sides of the core plate. Further, a damper for a torque converter, which may absorb impact and vibration applied in a rotation direction of the shaft, is coupled to the core plate.

In a damper system for a torque converter, springs are generally disposed in parallel, such that the springs absorb the same load.

However, in the damper system for a torque converter, rigidity of a damper spring needs to be decreased to reduce gear shift impact, and to this end, a configuration in which the springs are connected in series has been proposed. A serially-connected damper system in the related art has a configuration in which multiple springs are connected in series on the same circumference. In the torque converter having the serially-connected damper system, there are problems in that an operating radius of a spring or a damper system is restricted due to a limitation on durability and mounting spaces of the springs, and implementation of low rigidity and a wide angle is restricted.

DISCLOSURE

Technical Problem

The present invention has been made in an effort to provide a torque converter for a vehicle which has a driven plate which is formed with curved portion, and springs which are disposed in a longitudinal direction, thereby increasing a limitation on an operating radius of the torsional damper and implementing low rigidity and a wide angle.

Technical Solution

An exemplary embodiment of the present invention provides a torque converter for a vehicle, including: a front cover; an impeller which is coupled to the front cover and rotates together with the front cover; a turbine which is disposed at a position facing the impeller; a reactor which is positioned between the impeller and the turbine and changes a flow of oil flowing from the turbine to the impeller; a lock-up clutch which has a piston that directly connects the front cover and the turbine; and a torsional damper which includes a pair of retaining plates that receives driving power of an engine from the turbine or the lock-up clutch, and a driven plate that is disposed between the retaining plates, the torsional damper being coupled to the lock-up clutch and absorbing impact and vibration applied in a rotation direction; in which multiple spring assembly seating portions are formed in the retaining plates, spring assemblies are disposed in the multiple spring assembly seating portions so as to impart elasticity in a direction from a circumference of the torsional damper to an rotation axis, the driven plate has an approximately circular plate shape, multiple curved portions and multiple edge portions are formed on an outer circumferential surface of the driven plate, each of the curved portions has a curvature that is more gradual than an imaginary circumference defined by a maximum diameter of the driven plate, and the spring assemblies are in contact with the curved portions to apply elasticity to the curved portions.

The torsional damper may include the three spring assembly seating portions, the three spring assemblies, the three curved portions, and the three edge portions.

Lengths of the multiple curved portions may be approximately equal to one another.

Intervals between the multiple spring assembly seating portions may be approximately equal to one another.

Each of the spring assemblies may include a spring, and a spring seat which is coupled to the spring and has a hemispheric shape, and the spring seat may be disposed such that a portion, which defines a curved surface of the hemispheric shape, is in contact with the curved portion.

Each of the spring assemblies may include a spring, and a spring seat which is coupled to the spring and disposed to be in contact with the curved portion, the spring seat may have a stopper that protrudes in a lateral direction of the spring assembly, and the stopper may prevent the edge portion of the driven plate and the spring assembly from intersecting and passing each other.

Advantageous Effects

The exemplary embodiment of the present invention may provide the torque converter for a vehicle which has the driven plate formed with the curved portions, and the springs which are disposed in the longitudinal direction and apply elasticity to the curved portions, such that a limitation on an operating radius of the torsional damper may be increased, and low rigidity and a wide angle may be implemented, and as a result, NVH (noise, vibration, harshness) performance and fuel economy of a vehicle may be improved.

MODE FOR INVENTION

Figure 1:
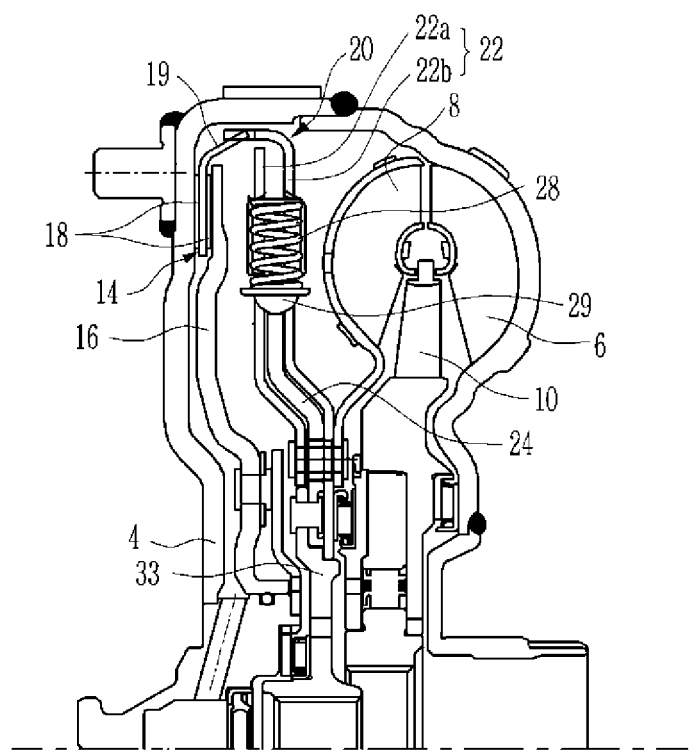
FIG. 1 is a half cross-sectional view of a torque converter according to an exemplary embodiment of the present invention, which is shown by cutting the torque converter in an axial direction.

Hereinafter, exemplary embodiments of the present invention will be described in detail with reference to the accompanying drawings so that those skilled in the technical field to which the present invention pertains may easily carry out the exemplary embodiment. However, the present invention may be implemented in various different ways, and is not limited to exemplary embodiments described herein. A part irrelevant to the description will be omitted in the drawings to clearly describe the present invention, and the same or similar constituent elements will be designated by the same reference numerals throughout the specification.

Figure 2:
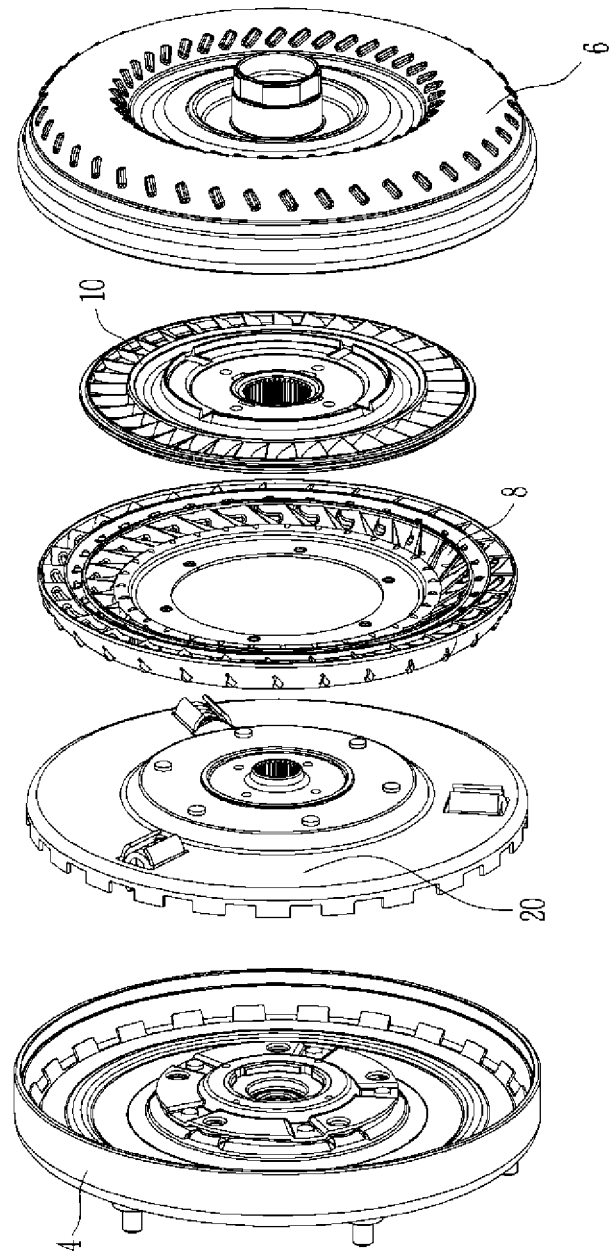
FIG. 2 is an exploded perspective view illustrating a main part of the torque converter according to the exemplary embodiment of the present invention.

FIG. 1 is a half cross-sectional view of a torque converter according to an exemplary embodiment of the present invention, which is shown by cutting the torque converter in an axial direction, and FIG. 2 is an exploded perspective view illustrating a main part of the torque converter according to the exemplary embodiment of the present invention.

A torque converter for a vehicle according to the present invention includes a front cover 4 which is connected to a crank shaft of an engine and rotates, an impeller 6 which is connected to the front cover 4 and rotates together with the front cover 4, a turbine 8 which is disposed at a position facing the impeller 6, and a reactor 10 (also called a 'stator') which is positioned between the impeller 6 and the turbine 8, changes a flow of oil flowing from the turbine 8, and delivers the oil to the impeller 6. The reactor 10, which delivers the oil to the impeller 6, has the same rotation center as the front cover 4. Further, a lock-up clutch 14, which is used as a means for directly connecting the engine and a transmission, is disposed between the front cover 4 and the turbine 8.

The lock-up clutch 14 has a piston 16 which has an approximately circular plate shape and may be moved in the axial direction.

Further, a core plate 19, which has friction members 18, is coupled between the front cover 4 and the piston 16.

Further, a torsional damper 20, which attenuates vibration and absorbs torsional force applied in a rotation direction of the shaft when the friction member 18 comes into close contact with the front cover 4, is coupled to the lock-up clutch 14.

The friction members 18 are coupled to both sides of the core plate 19, and the core plate 19 is disposed between the front cover 4 and the piston 16.

Meanwhile, the torsional damper 20 according to the exemplary embodiment of the present invention may include a pair of retaining plates 22, a driven plate 24, springs 28, and spring seats 29.

The retaining plates 22 may transmit driving power of the engine, which is transmitted through the core plate 19, to the springs 28. The springs 28 are disposed between the pair of retaining plates 22 in a radial direction with respect to a rotation axis of the torsional damper 20, and each of the springs 28 is configured as a compressive coiled spring, thereby absorbing vibration and impact applied in the rotation direction. The driving power of the engine, which is transmitted to the springs 28, may be transmitted to the driven plate 24. The driving power, which is transmitted to the driven plate 24, may be transmitted to the transmission (not illustrated) through a spline hub 33 (see FIG. 1). Meanwhile, the retaining plates 22 are connected to a shaft of the turbine 8 and may receive the driving power of the engine transmitted through the turbine 8.

An operating process of the exemplary embodiment of the present invention configured as described above will be described below in detail.

In a state in which the lock-up clutch 14 does not operate, the driving power of the engine is transmitted to the impeller 6 through the front cover 4. The driving power of the engine, which is transmitted to the impeller 6, is transmitted to the retaining plates 22 through the turbine 8. Further, the driving power of the engine, which is transmitted to the retaining plates 22, is transmitted to the driven plate 24 through the springs 28. In this case, vibration and impact in the rotation direction are absorbed by the springs 28. The driving power of the engine, which is transmitted to the driven plate 24, is transmitted to the transmission (not illustrated) through the spline hub 33.

In a case in which the piston 16 operates and thus the lock-up clutch 14 operates, the friction members 18 come into close contact with the front cover 4 and the piston 16 between the front cover 4 and the piston 16, such that the driving power of the engine is transmitted to the retaining plates 22 through the front cover 4 and the core plate 19.

The driving power of the engine, which is transmitted to the retaining plates 22, is transmitted to the springs 28, and the springs 28 absorb vibration and impact in the rotation direction. The driving power of the engine, which is transmitted to the springs 28, is transmitted to the spline hub 33 through the driven plate 24. The driving power of the engine, which is transmitted to the spline hub 33, may be transmitted to the transmission (not illustrated).

Figure 3:
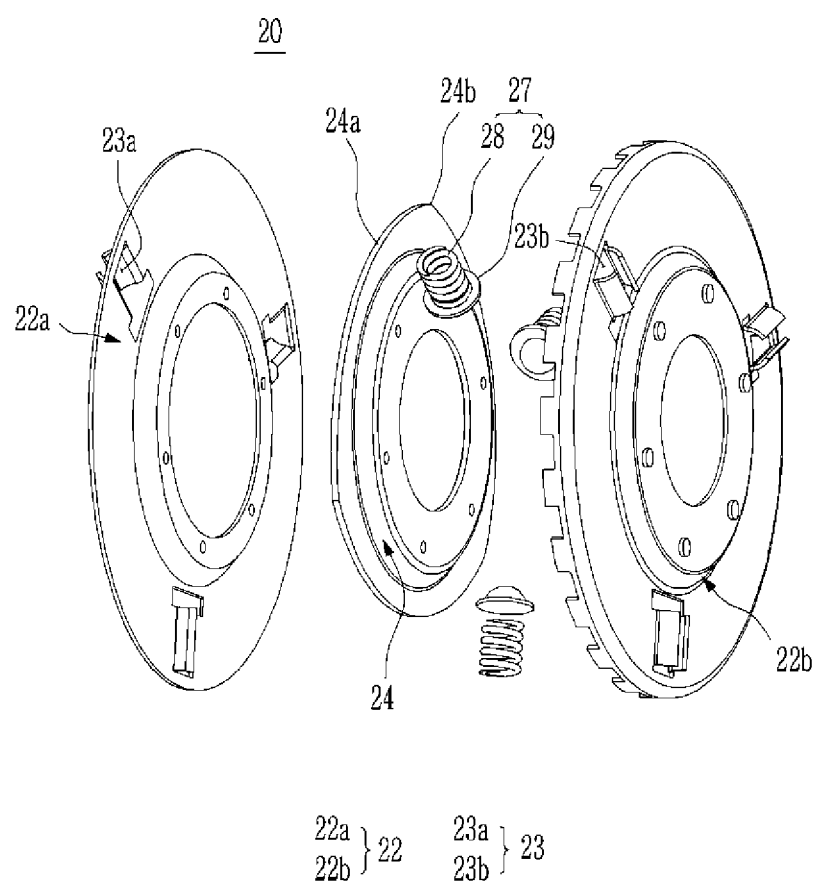
FIG. 3 is an exploded perspective view of a torsional damper according to the exemplary embodiment of the present invention.

FIG. 3 is an exploded perspective view of the torsional damper according to the exemplary embodiment of the present invention.

As described above, the torsional damper 20 according to the exemplary embodiment of the present invention may include the pair of retaining plates 22, the driven plate 24, and spring assemblies 27.

The pair of retaining plates 22 may include a front retaining plate 22a and a rear retaining plate 22b. The front retaining plate 22a and the rear retaining plate 22b are coupled to each other, and the driven plate 24 is disposed between the front retaining plate 22a and the rear retaining plate 22b.

Spring assembly seating grooves 23a and 23b are formed in the front retaining plate 22a and the rear retaining plate 22b, respectively. As illustrated in FIG. 3, the number of spring assembly seating grooves 23a may be three, and the number of spring assembly seating grooves 23b may be three, but unlike the configuration illustrated in FIG. 3, the number of spring assembly seating grooves 23a may be two or four or more, and the number of spring assembly seating grooves 23b may be two or four or more.

When the front retaining plate 22a and the rear retaining plate 22b are coupled to each other so that the spring assembly seating grooves 23a and 23b are matched with one another, and spring assembly seating portions 23 are formed by the spring assembly seating grooves 23a and 23b.

The spring assemblies 27 are seated in the spring assembly seating portions 23. The spring assembly 27 may include the spring 28 and the spring seat 29. The springs 28 are disposed to be able to impart elasticity in the direction of the rotation axis of the torsional damper 20. The spring seat 29 is coupled to the spring 28 and may be coupled to be positioned in the direction toward the rotation axis of the torsional damper 20. The spring seat 29 may have a hemispheric shape.

Meanwhile, the driven plate 24 has an approximately circular plate shape, and an outer circumferential surface of the driven plate 24 may have curved portions 24a and edge portions 24b. The curved portion 24a has a curvature which is more gradual than an imaginary circumference defined by a maximum diameter of the driven plate 24. The edge portion 24b is formed at a point at which the two curved portions 24a meet together.

Referring to FIG. 3, three curved portions 24a are formed, and thus three edge portions 24b are formed. However, unlike the configuration illustrated in FIG. 3, two or four or more curved portions 24a and two or four or more edge portions 24b may be formed.

Meanwhile, one curved portion 24a may be formed to come into contact with one spring assembly 27, but the present invention is not limited thereto, and one curved portion 24a may come into contact with multiple spring assemblies 27. In this case, the retaining plates 24 may have the spring assembly seating portions 23 in accordance with the number of spring assemblies 27.

Figure 4:
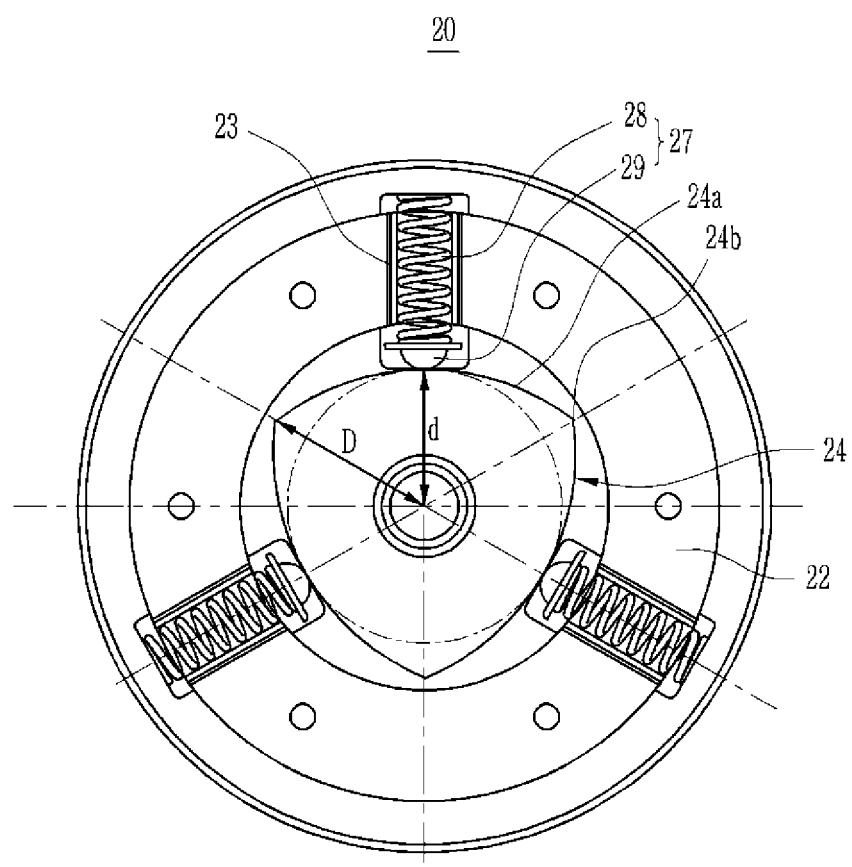
FIG. 4 is a view for explaining a state before the torsional damper according to the exemplary embodiment of the present invention operates.

FIG. 4 is a view for explaining a state before the torsional damper according to the exemplary embodiment of the present invention operates.

When the spring assemblies 27 are seated in the spring assembly seating portions 23 and the retaining plates 22 are coupled to each other with the driven plate 24 interposed therebetween, the spring assemblies 27 come into direct contact with the curved portions 24a of the driven plate 24, thereby pushing the driven plate 24 in the direction of the rotation axis of the torsional damper 20.

In this case, because the springs 28 are somewhat compressed, the spring assemblies 27 have nature that maintains a shortest distance from a central portion of the torsional damper 20. In addition, a length between the central portion and an outer circumferential surface of the driven plate 24 is longest between the central portion and the edge portion 24b (see D in FIG. 4) and shortest between the central portion and a center of the curved portion 24a (see d in FIG. 4). Therefore, when no external force is applied, the spring seat 29 of the spring assembly 27 is in contact with the center of the curved portion 24a of the driven plate 24.

Figure 5:
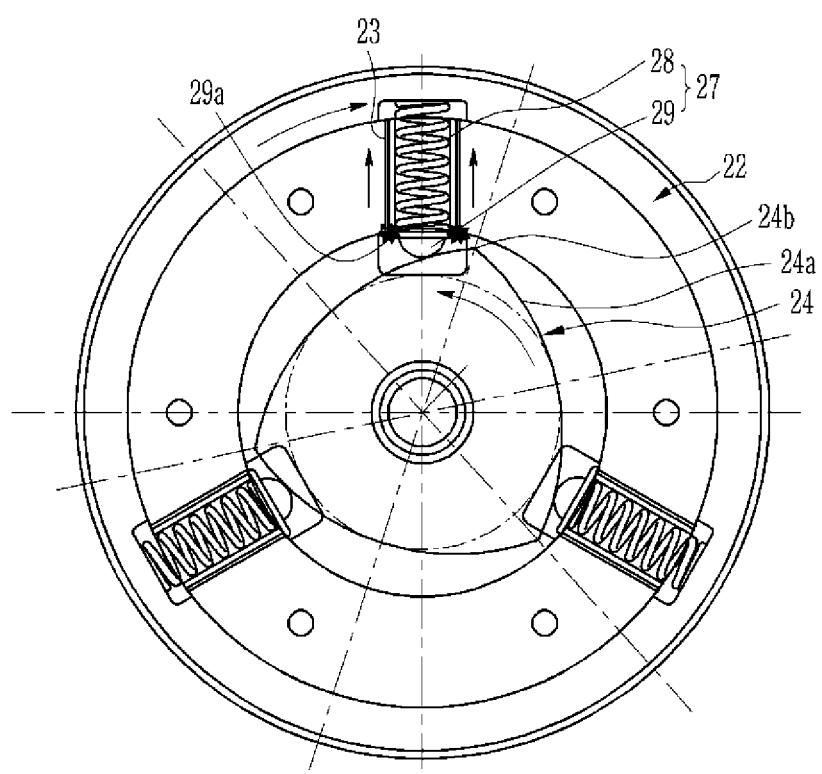
FIG. 5 is a view for explaining a state in which the torsional damper according to the exemplary embodiment of the present invention operates.

FIG. 5 is a view for explaining a state in which the torsional damper according to the exemplary embodiment of the present invention operates.

When rotational force is applied to the retaining plates 22 or the driven plate 24, the spring assemblies 27 are compressed while being moved along the curved portions 24a of the driven plate 24. In this case, the spring assemblies 27 apply elastic force to the curved portions 24a. That is, the springs 28 absorb vibration and impact in the rotation direction.

A stopper 29a may be formed on the spring seat 29. The stopper 29a may protrude in a lateral direction of the spring assembly 27. In this case, the spring assembly seating portion 23 of the retaining plates 22 may be smaller than the stopper 29a. In this case, when the spring 28 is compressed as the retaining plates 22 rotate or the driven plate 24 rotates, the spring seat 19 is caught by the spring assembly seating portion 23, such that the spring 28 is not further compressed. Therefore, it is possible to prevent the retaining plates 22 or the driven plate 24 from being rotated to the extent that the edge portions 24b of the driven plate 24 and the spring assemblies 27 intersect and pass each other.

Referring to FIG. 5, lengths of the multiple curved portions 24a may be approximately equal to one another. In addition, intervals between the multiple spring assembly seating portions 23 in which the spring assemblies 27 are seated may be approximately equal to one another. In this case, each of the spring assemblies 27 and each of the curved portions 24a, which are in contact with each other, have approximately the same operating radius as another spring assembly 27 and another curved portion 24a.

Meanwhile, as described above, the spring seat 29 may have a hemispheric shape and may be disposed such that a portion, which defines a curved surface of the hemispheric shape, is in contact with the curved portion 24a of the driven plate 25. Therefore, the spring assembly 27 and the driven plate 24 may smoothly slide.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A torque converter for a vehicle, comprising:
   a front cover;
   an impeller which is coupled to the front cover and rotates together with the front cover;
   a turbine which is disposed at a position facing the impeller;
   a reactor which is positioned between the impeller and the turbine and changes a flow of oil flowing from the turbine to the impeller;
   a lock-up clutch which has a piston that directly connects the front cover and the turbine; and
   a torsional damper which includes a pair of retaining plates that receives driving power of an engine from the turbine or the lock-up clutch, and a driven plate that is disposed between the retaining plates, the torsional damper being coupled to the lock-up clutch and absorbing impact and vibration applied in a rotation direction;
   wherein multiple spring assembly seating portions are formed in the retaining plates, spring assemblies are disposed in the multiple spring assembly seating portions so as to impart elasticity in a direction from a circumference of the torsional damper to an rotation axis,
   the driven plate has an approximately circular plate shape, multiple curved portions and multiple edge portions are formed on an outer circumferential surface of the driven plate, each of the curved portions has a curvature that is more gradual than an imaginary circumference defined by a maximum diameter of the driven plate, and
   the spring assemblies are in contact with the curved portions to apply elasticity to the curved portions.

2. The torque converter of claim 1, wherein:
   the torsional damper includes:
   three spring assembly seating portions, three spring assemblies, three curved portions, and the three edge portions.

3. The torque converter of claim 1, wherein:
   lengths of the multiple curved portions are approximately equal to one another.

4. The torque converter of claim 1, wherein:
   intervals between the multiple spring assembly seating portions are approximately equal to one another.

5. The torque converter of claim 1, wherein:
each of the spring assemblies includes a spring, and a spring seat which is coupled to the spring and has a hemispheric shape, and
the spring seat is disposed such that a portion, which defines a curved surface of the hemispheric shape, is in contact with the curved portion.

6. The torque converter of claim 1, wherein:
each of the spring assemblies includes a spring, and a spring seat which is coupled to the spring and disposed to be in contact with the curved portion,
the spring seat has a stopper that protrudes in a lateral direction of the spring assembly, and
the stopper prevents the edge portion of the driven plate and the spring assembly from intersecting and passing each other.

* * * * *